(12) United States Patent
Hunt et al.

(10) Patent No.: US 8,682,139 B2
(45) Date of Patent: Mar. 25, 2014

(54) L-CUT STREAM STARTUP

(75) Inventors: Neil D. Hunt, Los Altos, CA (US); Christian Kaiser, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 162 days.

(21) Appl. No.: 13/099,319

(22) Filed: May 2, 2011

(65) Prior Publication Data

US 2012/0281965 A1 Nov. 8, 2012

(51) Int. Cl.
*H04N 9/80* (2006.01)

(52) U.S. Cl.
USPC .......................................... 386/248

(58) Field of Classification Search
USPC .................. 386/200, 201, 207, 208, 239, 248
See application file for complete search history.

(56) References Cited

U.S. PATENT DOCUMENTS

| | | | |
|---|---|---|---|
| 5,642,171 A * | 6/1997 | Baumgartner et al. | 348/515 |
| 6,263,150 B1 * | 7/2001 | Okada et al. | 386/283 |
| 7,551,839 B2 * | 6/2009 | Yamada et al. | 386/239 |
| 7,567,746 B2 * | 7/2009 | Saeki | 386/248 |
| 2004/0109677 A1 * | 6/2004 | Seo et al. | 386/95 |
| 2006/0271983 A1 * | 11/2006 | Katayama et al. | 725/100 |
| 2010/0158101 A1 | 6/2010 | Wu et al. | |
| 2010/0161825 A1 | 6/2010 | Ronca et al. | |
| 2010/0211199 A1 | 8/2010 | Nalk et al. | |

OTHER PUBLICATIONS

International Search Report, Application No. PCT/US12/36013, dated Jul. 9, 2012.

* cited by examiner

*Primary Examiner* — Tat Chio
(74) *Attorney, Agent, or Firm* — Patterson + Sheridan, L.L.P.

(57) ABSTRACT

One embodiment of the present invention sets forth a technique for starting playback of an audio portion of digital media content before a video portion of the digital media content is received. An advantage of the disclosed technique is that the perceived delay from the time when a user selects the digital media content to when playback of the digital media content begins is reduced. The audio may be faded-in and one or more still frames of video data may be displayed while the video stream is retrieved. Additionally, a license for DRM (Digital Rights Management) encryption of the title content may be retrieved before starting playback of the video stream, so that the digital media content that is retrieved is also protected.

18 Claims, 8 Drawing Sheets

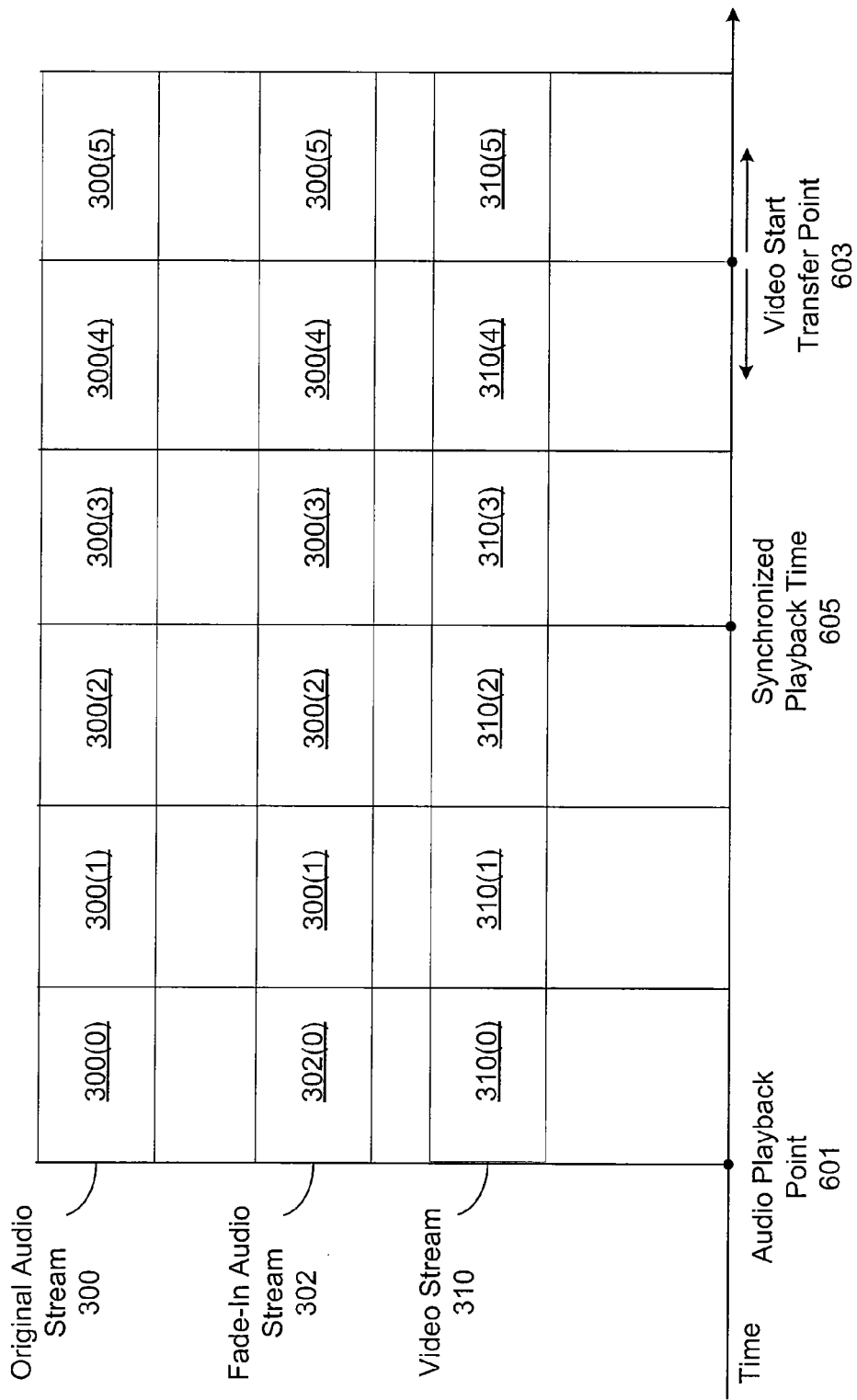

L-CUT STREAM STARTUP

BACKGROUND OF THE INVENTION

1. Field of the Invention

Embodiments of the present invention relate generally to digital media and, more specifically, to beginning audio playback while video data is retrieved.

2. Description of the Related Art

Digital media content distribution systems conventionally include a content server, a content player, and a communications network connecting the content server to the content player. The content server is configured to store digital media content files, which can be downloaded from the content server to the content player. Each digital media content file corresponds to a specific identifying title, such as "Gone with the Wind," which is familiar to a user. The digital media content file typically includes sequential content data, organized according to playback chronology, and may comprise audio data, video data, or a combination thereof.

The content player is configured to download and play a digital media content file, in response to a user request selecting the title for playback. The process of playing the digital media content file includes decoding audio and video data into a synchronized audio signal and video signal, which may drive a display system having a speaker subsystem and a video subsystem. Playback typically involves a technique known in the art as "streaming," whereby the content server sequentially transmits the digital media content file to the content player, and the content player plays the digital media content file while content data is received that comprises the digital media content file.

When a user initiates playback of the digital media content for a title or a preview clip, there is a delay before the playback of the selected digital media content begins. The delay is a result of the time needed for the content player to request the selected digital media content and for the content server to locate and transmit the digital media content file to the content player. Additionally, a minimum amount of video data must be received by the content player before decoding of the video data can begin. Playback of the video data may only begin after a full GOP (group of pictures) has been received and decoded.

As the foregoing illustrates, what is needed in the art is improved techniques that minimize the delay between the time a user selects the digital media content to when playback of the digital media content begins.

SUMMARY OF THE INVENTION

One embodiment of the present invention sets forth a method for beginning audio playback while video data is retrieved, i.e., performing an L-cut at the startup of a digital media content stream. In video editing an L-cut is a cut between two scenes where the transition of audio starts before the transition of video, i.e., the audio of scene two starts while the last few frames of the video of scene one are still playing.

The method for playback of an audio stream before synchronized playback of the audio stream with a video stream comprises the steps of receiving, when playback of digital media content is initiated, an audio playback point within the digital media content including the audio stream and the video stream which are each encoded as a sequence of intervals. A first interval of the audio stream beginning at the audio playback point is retrieved and retrieval of one or more additional intervals of the audio stream that are subsequent to the first interval is initiated. The first interval of the audio stream is played without yet playing any interval of the video stream. A video start transfer point that occurs subsequent to the audio playback point is determined and retrieval of the video stream beginning at the video start transfer point is initiated.

One advantage of the disclosed technique is that the perceived delay between the time a user selects the digital media content to when playback of the digital media content begins is reduced because playback of the audio portion of the digital media content starts before the video portion of the digital media content is received. The audio may be faded-in and one or more still frames of the video data may be displayed while the full video data is retrieved. Additionally, a license for DRM (Digital Rights Management) encryption of the title content may be retrieved before starting playback of the video, so that the digital media content that is retrieved is protected.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A is another illustration of playback of the fade-in audio stream and synchronization with the video stream, according to one embodiment of the invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
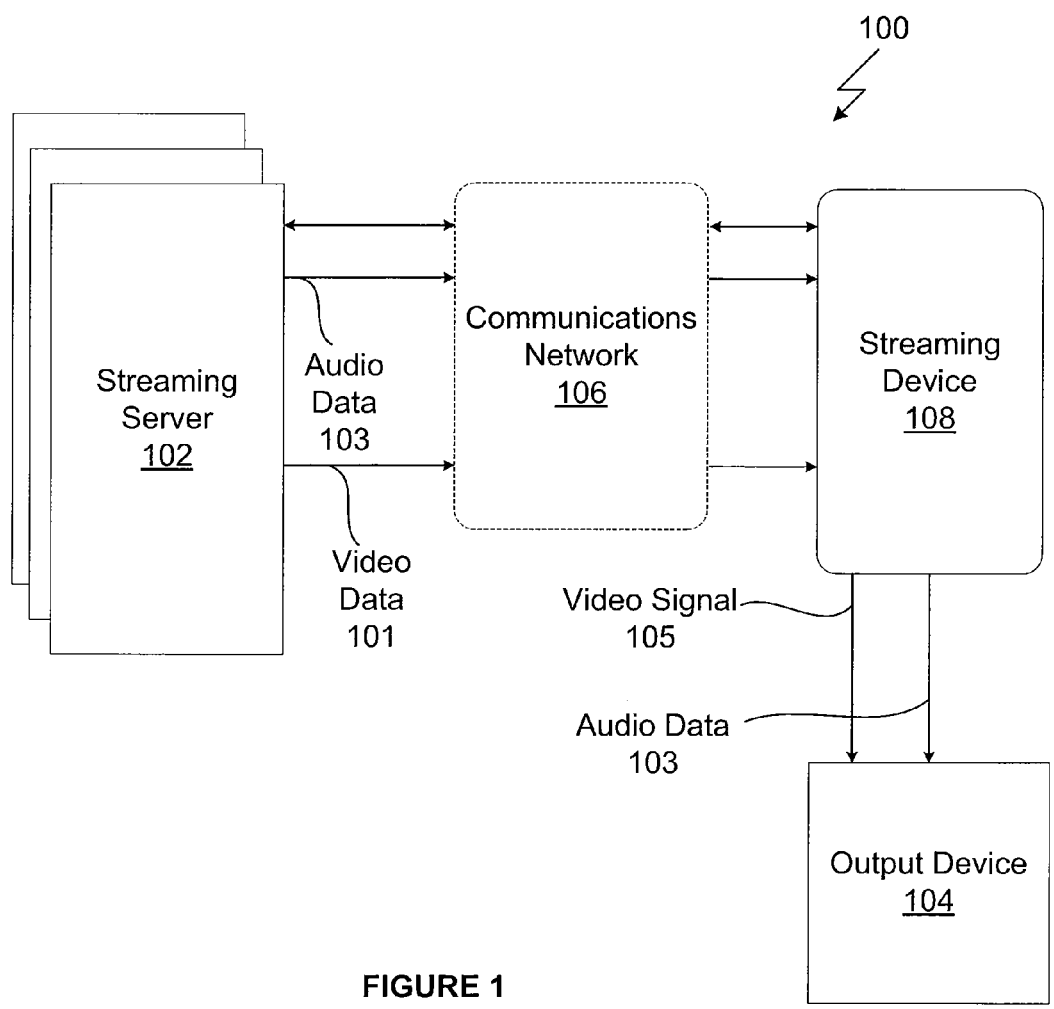
FIG. 1 illustrates a content distribution system configured to implement one or more aspects of the present invention.

FIG. 1 illustrates a content distribution system 100 configured to implement one or more aspects of the invention. As shown, the content distribution system 100 includes a streaming server 102, a communications network 106, a streaming device 108, and output device(s) 104. The content distribution system 100 may include a plurality of communications networks 106, such as routers and switches, configured to facilitate data communication between the streaming server 102 and the streaming device 108. The output device(s) 104 is configured to produce a display image and associated sound and is typically directly coupled to the streaming device 108 by a wired or wireless connection. Persons skilled in the art will recognize that many technically feasible techniques exist for transmitting data between the streaming server 102, the streaming device 108 and the output device(s) 104, including technologies practiced in deploying the well-known internet communications network.

The streaming server 102 is a computer system configured to encode video and/or audio streams associated with digital media content files for streaming. The content distribution system 100 maybe include one or more streaming servers 102, where each streaming server 102 is configured to perform all the functions needed to encode the video and/or audio streams or where each streaming server 102 is configured to perform a particular function needed to encode the video and/or audio streams. The digital media content files including the encoded video and audio streams are retrieved by the streaming device 108 via the communications networks 106 for output to the output device(s) 104.

As shown in FIG. 1, audio data 103 and video data 101 represent the encoded audio and video streams that are transmitted from the streaming server 102 to the streaming device 108. The streaming device 108 passes the audio data 103 through to the output device 104 unchanged. The video data 101 is uncompressed (if in a compressed format) or decoded into raw frames or PCM (pulse code modulated) intervals and output by the streaming device 108 to the output device(s) 104 as video signal 105. The output device(s) 104 may include a display device and speaker device for presenting video image frames, and generating acoustic output, respectively.

The streaming server 102 comprises one or more computer systems configured to serve download requests for digital media content files from the streaming device 108. The digital media content files may reside on a mass storage system accessible to the computer system. The mass storage system may include, without limitation, direct attached storage, network attached file storage, or network attached block-level storage. The digital media content files may be formatted and stored on the mass storage system using any technically feasible technique. A data transfer protocol, such as the well-known hyper-text transfer protocol (HTTP), may be used to download digital media content files from wherever the digital media content files are stored to the streaming device 108.

The streaming device 108 may comprise a computer system, a set top box, a mobile device such as a mobile phone, or any other technically feasible computing platform that has network connectivity and is coupled to or includes the output device(s) 104. The streaming device 108 is configured for streaming, i.e., to download units of a video stream encoded to a specific playback bit rate. In one embodiment, the streaming device 108 is configured to switch to downloading subsequent units of a video stream encoded to a different playback bit rate based on prevailing bandwidth conditions within the communications network 106. As bandwidth available within the communications network 106 becomes limited, the streaming device 108 may select a video stream encoded to a lower playback bit rate. As the bandwidth increases, a video stream encoded to a higher playback bit rate may be selected.

The audio stream is typically a much lower playback bit rate than the corresponding video stream and is therefore not typically encoded at different playback bit rates. Because the audio stream requires much less bandwidth compared with the video stream, the audio stream may be quickly retrieved by the streaming device 108. Once a user selects a particular content title, the audio stream may be transferred and begin playback before the corresponding portions of the video stream are received. Beginning playback of the audio stream while the video stream is retrieved reduces the delay perceived by the user between the time the content title is selected to when the content title begins to play. In one embodiment, still frames of the video content are quickly retrieved and displayed while the full video stream is retrieved.

Although, in the above description, the content distribution system 100 is shown with one streaming device 108, persons skilled in the art will recognize that the architecture of FIG. 1 contemplates only an exemplary embodiment of the invention. Other embodiments may include any number of streaming device 108. Thus, FIG. 1 is in no way intended to limit the scope of the present invention in any way.

Figure 2:
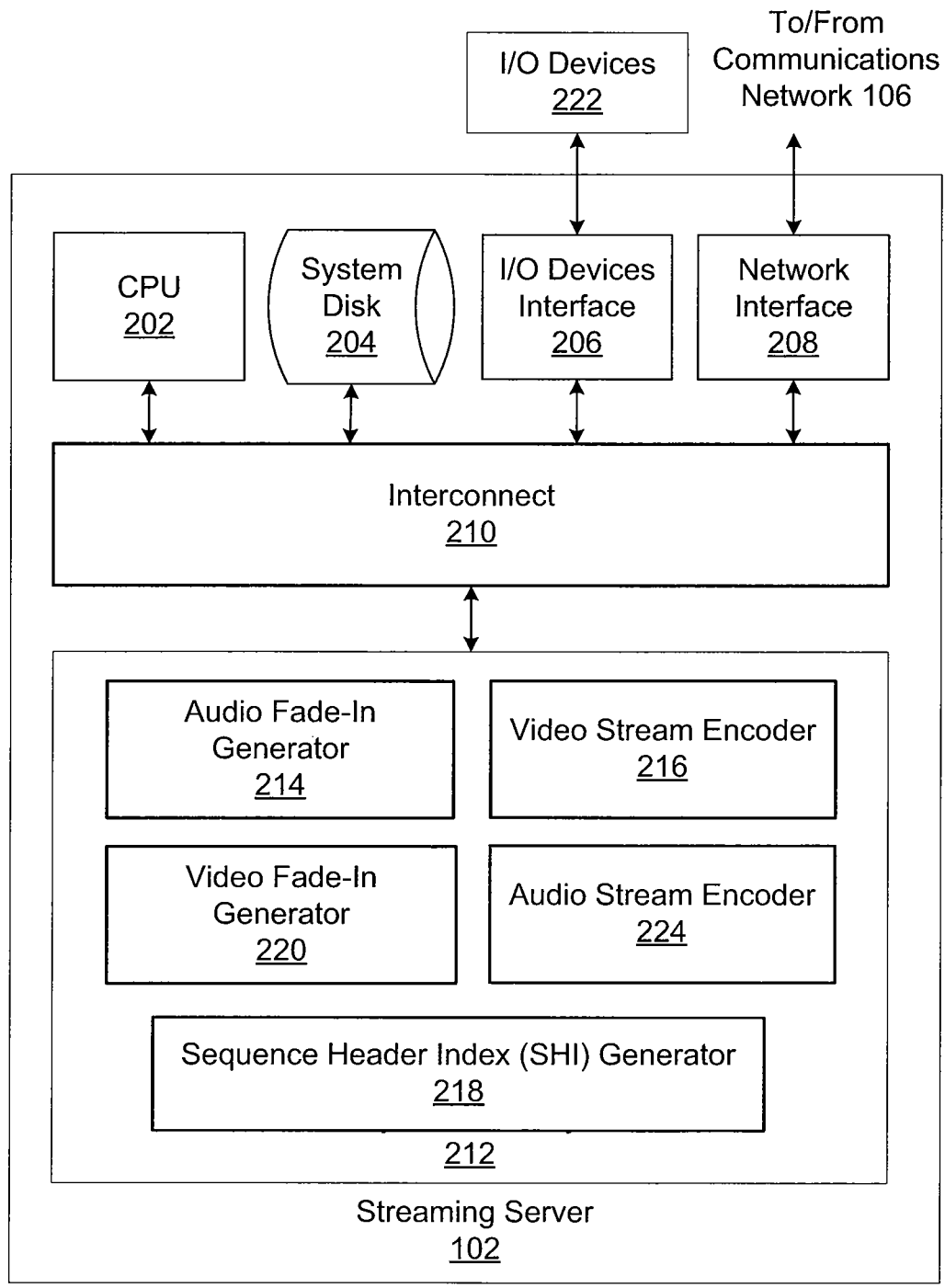
FIG. 2 is a more detailed view of the streaming device of FIG. 1, according to one embodiment of the invention.

FIG. 2 is a more detailed view of the streaming server 102 of FIG. 1, according to one embodiment of the invention. As shown, the streaming server 102 includes a central processing unit (CPU) 202, a system disk 204, an input/output (I/O) devices interface 206, a network interface 208, an interconnect 210 and a system memory 212.

The CPU 202 is configured to retrieve and execute programming instructions stored in the system memory 212. Similarly, the CPU 202 is configured to store application data and retrieve application data from the system memory 212. The interconnect 210 is configured to facilitate transmission of data, such as programming instructions and application data, between the CPU 202, the system disk 204, I/O devices interface 206, the network interface 208, and the system memory 212. The I/O devices interface 206 is configured to receive input data from I/O devices 222 and transmit the input data to the CPU 202 via the interconnect 210. For example, I/O devices 222 may comprise one or more buttons, a keyboard, and a mouse or other pointing device. The I/O devices interface 206 is also configured to receive output data from the CPU 202 via the interconnect 210 and transmit the output data to the I/O devices 222. The system disk 204, such as a hard disk drive or flash memory storage drive or the like, is configured to store non-volatile data such as encoded video streams. The encoded video streams can then be retrieved by the streaming device 108 via the communications network 104. The network interface 218 is coupled to the CPU 202 via the interconnect 210 and is configured to transmit and receive packets of data via the communications network 104. In one embodiment, the network interface 208 is configured to operate in compliance with the well-known Ethernet standard.

The system memory 212 includes software components that include instructions for encoding one or more audio and video streams associated with a specific content title for streaming. As shown, these software components include an audio fade-in generator 214, a video stream encoder 216, an audio stream encoder 224, a sequence header index (SHI) generator 218, and a video fade-in generator 220.

The video stream encoder 216 executes encoding operations for encoding a video stream to a specific playback bit rate such that the encoded video stream complies with a particular video codec standard, such as VC1, and is configured for streaming. In an alternative embodiment, the video stream can be encoded to comply with a different video codec standard such as MPEG or H.264. In operation, for a particular video stream, the video stream encoder 216 encodes the video stream to different constant bitrates to generate multiple encoded video streams, each encoded video stream associated with a different constant bit rate and, thus, having a different quality. An encoded video stream generated by the video stream encoder 216 includes a sequence of groups of pictures (GOPs), each GOP comprising multiple image frames of video data. In practice, a GOP may include multiple scenes or portions of a scene. A GOP typical corresponds to 2.5 seconds or 10 seconds of playback time, although other durations may also be used. A GOP is specific to video data and one or more GOPs are included in an interval. For each interval of video data, there may be a corresponding interval of audio data. The video and audio streams each include a sequence of intervals.

The SHI generator 218 generates a sequence header index associated with each encoded video stream. To generate the sequence header index, the SHI generator 218 first searches the encoded video stream for the key frames associated with the different intervals included in the encoded video stream. The key frames can be located by the SHI generator 218 based on the sequence start codes specified in the sequence headers included in the key frames. For the interval associated with each of the identified key frames, the SHI generator 218 defines a switch point within the sequence header index that stores (i) a data packet number that identifies the data packet that includes the key frame associated with the interval and (ii) the playback offset associated with the interval. Again, the playback offset associated with the interval is determined based on the location of the interval in the sequence of intervals included in the encoded video stream.

The audio stream encoder 224 executes encoding operations for encoding an audio stream to a specific playback bit rate such that the encoded audio stream is configured for streaming and synchronization with the video stream. The sequence header indexes associated with each encoded video stream that are generated by the SHI generator 218 are also associated with the encoded audio stream. The switch points defined by the SHI generator 218 within the sequence header index stores (i) a data packet numbers that identifies the data packet for the audio data corresponding to each interval of the audio and video data and (ii) the playback offset in the audio data associated with each interval of the audio data.

The audio fade-in generator 214 and the video fade-in generator 220 are configured to generate encoded audio and video streams, respectively, based on a specified effect. In sum, any function may be applied to an audio or video data to modulate the audio or video data, respectively. In one embodiment, a fade-in audio stream may be generated by the audio effect generator 214 for a preview clip corresponding to a pivotal moment in a movie. The audio data is passed from the streaming server 102 to the streaming device 108 without modification. Consequently, playback volume is entirely controlled by the output device 104 where the decoded audio signal may be modulated using simple calculations.

In some cases, the audio data for the preview clip is very loud, e.g., a battle scene, and the output volume control of the output device may also be set at a high level based on the previous content playback. When playback of the preview clip starts, the resulting output volume level of the audio signal may be unpleasantly high. Because the audio data is passed from the streaming server 102 to the streaming device 108 without modification, it is not possible to decrease the volume level by modulating the audio data before the audio data is provided to the streaming device 108.

The generated fade-in audio stream is a version of the original audio stream starting at a low volume level and increasing the volume level during an interval. When a preview clip is selected for playback, the fade-in audio stream is retrieved by the streaming device 108 so that the resulting output volume of the audio signal starts at a low level and increases to the full level of the original audio during a fade-in time envelope. The fade-in ensures that the audio volume level is not unpleasantly high at the start of the preview clip. Because the audio data 103 is passed from the streaming server 102 to the streaming device 108 without modification, the fade-in audio stream is precomputed by the streaming server 102 or may be generated on-the-fly, i.e., in real-time, by the streaming server 102 when adequate computation resources are available. The streaming device 108 typically is not configured with enough computation resources to perform the modulation of the audio stream on-the-fly.

The generated fade-in video stream may be one or more still frames of the video data for each interval. In another embodiment, the generated fade-in video stream is a version of the original data stream starting at a low visibility level and increasing the visibility level during one or more intervals. When a preview clip is selected for playback, the fade-in video stream may be retrieved by the streaming device 108 before the video stream is retrieved in order to provide video content for display while the video stream is retrieved by the streaming device 108.

The fade-in video stream may be precomputed by the streaming server 102. In contrast with the audio data, the video data is typically processed by the streaming device 108 before being output to the output device(s) 104, i.e., decoding the video data to raw frames of PCM (pulse code modulated) streams. Therefore, the fade-in video stream may be generated on-the-fly by the streaming server 102. The streaming device 108 typically is not configured with enough computation resources to perform the modulation of the audio stream on-the-fly. However, in one embodiment the streaming device 108 is configured to generate at least one still frame from a first key frame included in the video stream that is retrieved.

Figure 3A:
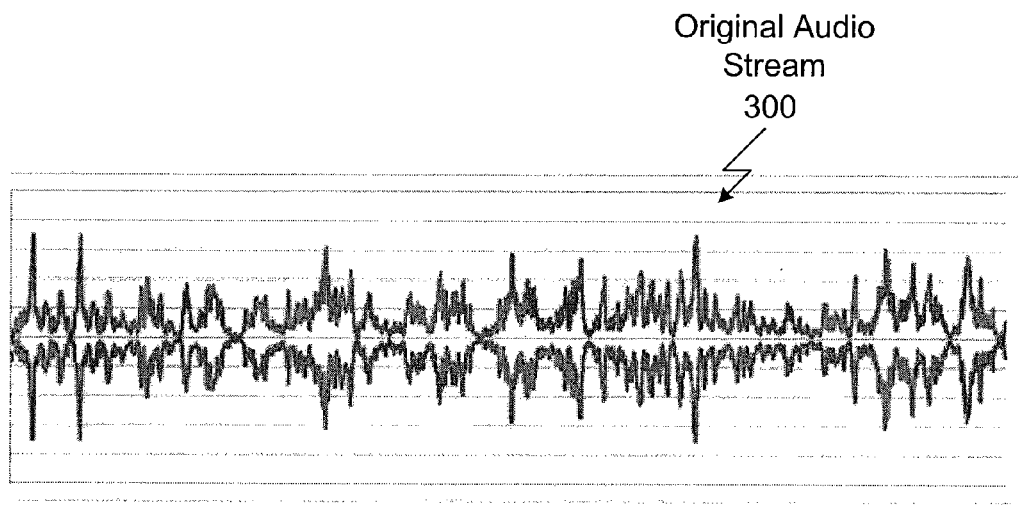
FIG. 3A is an illustration of an original audio stream generated by the streaming server of FIG. 1, according to one embodiment of the invention.

FIG. 3A is an illustration of an original audio stream 300 that is encoded by the streaming server 102 of FIG. 1, according to one embodiment of the invention. The audio stream 300 may be received by the streaming device 108 before the corresponding video stream. Playback of the audio stream 300 may start before playback of the corresponding video stream.

Figure 3B:
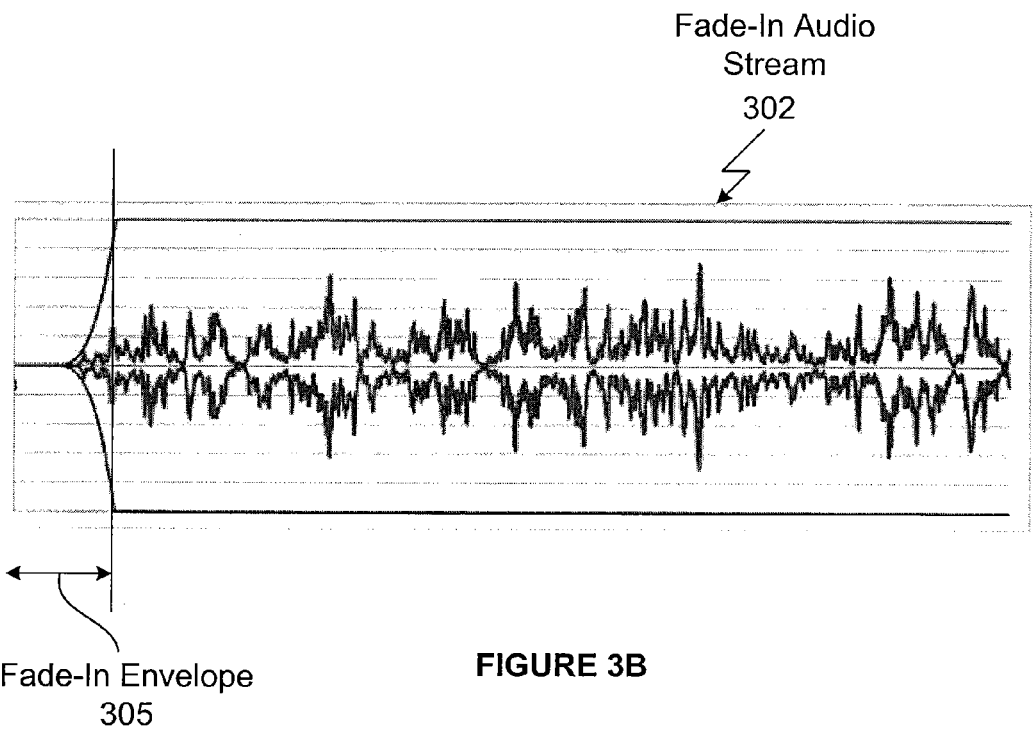
FIG. 3B is an illustration of a fade-in audio stream generated by the audio effect generator of FIG. 2, according to one embodiment of the invention.

FIG. 3B is an illustration of a fade-in audio stream 302 generated by the audio fade-in generator 214 of FIG. 2, according to one embodiment of the invention. During a fade-in envelope 305 the original audio stream 300 is modulated to start at the lowest volume level and then increase across the fade-in envelope to match the volume level of the original audio stream 300 at the same point in time. After the fade-in envelope 305 the fade-in audio stream 302 matches the original audio stream 300.

In one embodiment, the audio fade-in generator 214 precomputes the fade-in audio stream 302 and the entire fade-in audio stream 302 is provided to the streaming device 108 instead of the original audio stream 300. In another embodiment, the audio effect generator 214 computes the fade-in audio stream 302 on-the-fly, i.e., in real-time, when the corresponding content is requested by the streaming device 108. The audio stream provides the clock track for playback of the audio and video streams. Therefore, switching from one audio stream to another audio stream, such as switching from the fade-in audio stream 302 to the original audio stream 300, is only possible when the different audio streams are encoded to have the same playback time intervals and the same playback offsets. The streaming device 108 may be configured to switch between different encoded audio streams and between different encoded video streams.

In addition to generating multiple encoded video and audio streams for specified effects, the streaming server 102 may generate multiple encoded video streams associated with the same content title and encoded to different playback bit rates. The streaming device 108 may be configured to switch between video streams encoded at different fixed playback bit rates based on the bandwidth available through the communications network 106. The encoding process implemented by the streaming server 102 ensures that, across the different encoded video and audio streams the intervals are associated with the same playback time interval and that corresponding intervals across the different encoded video and audio streams are associated with the same playback offsets. Therefore, each switch point defined in a sequence header included in one of the encoded video stream associated with a specific content title has a corresponding switch point defined in a sequence header included in each of the other encoded video stream associated with the same content title. Similarly, when multiple encoded audio streams are generated, the audio data corresponding to the interval are associated with the same playback time interval and the same playback offsets. The streaming device 108 may switch between different encoded video streams based on the interval boundaries defined by the corresponding sequence header indices. Importantly, in order to properly switch between the different audio streams, the switch points defined by the SHI generator 218 within the sequence header index for the audio streams are matching in terms of time duration, bytes, and indices.

Figure 4A:
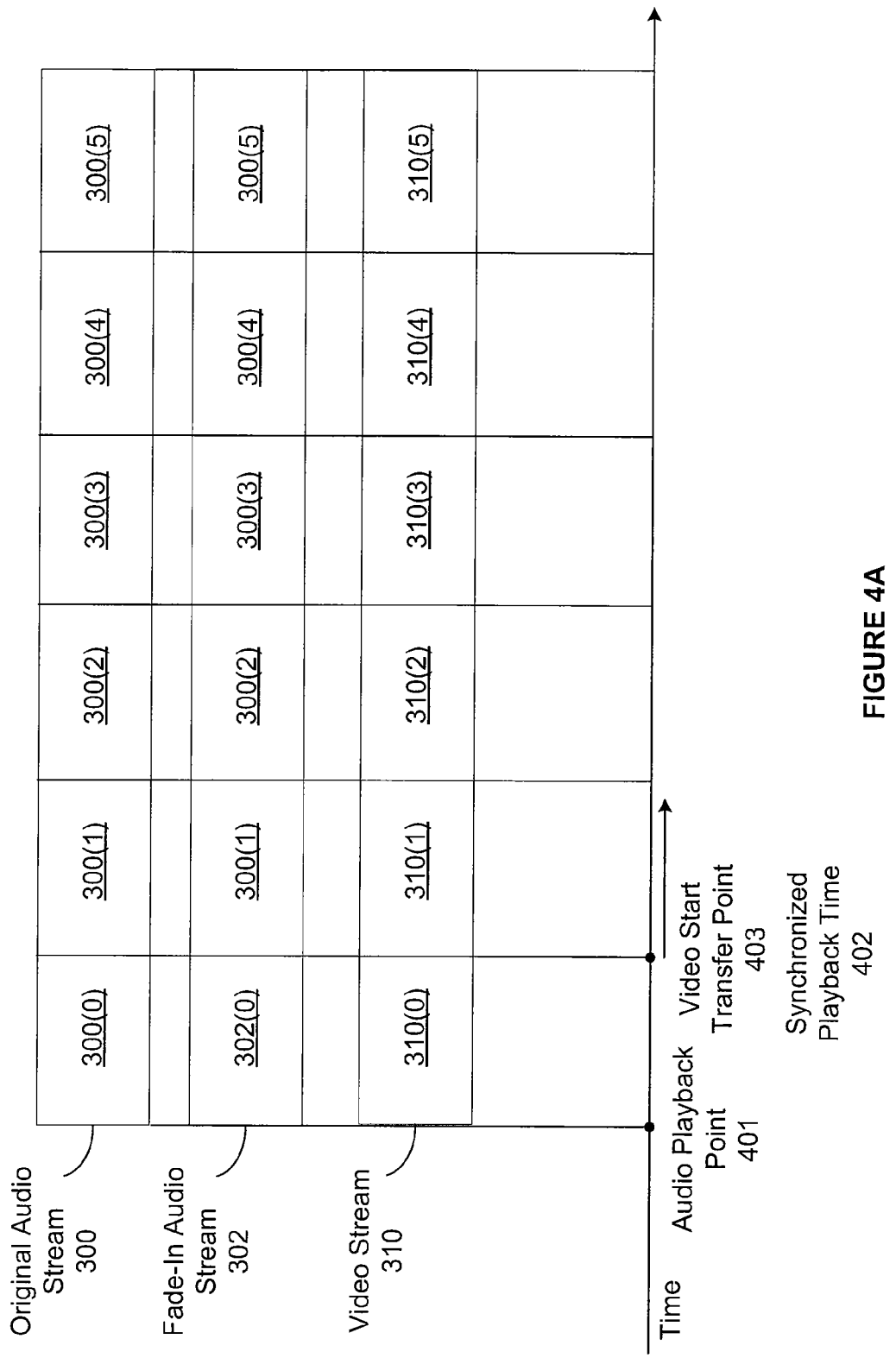
FIG. 4A is an illustration of playback of the fade-in audio stream and synchronization with the video stream, according to one embodiment of the invention.

FIG. 4A is an illustration of playback of the fade-in audio stream 302 and synchronization with a video stream 310, according to one embodiment of the invention. Each audio interval in the audio stream corresponds to an interval of the video stream and is associated with the same digital media content. The original audio stream 300 encoding generates audio intervals 300(0), 300(1), 300(2), 300(3), 300(4), and 300(5). The fade-in audio stream 302 encoding generates audio intervals 302(0), 300(1), 300(2), 300(3), 300(4), and 300(5). Audio interval 302(0) is the modulated audio signal for the fade-in effect during the fade-in envelope 305. Because a fixed rate encoding is performed, each interval is of equal and constant length in terms of bytes and playback duration.

When the fade-in audio stream 302 is retrieved by the streaming device 108, for viewing a preview clip, there is no need to switch between the fade-in audio stream 302 and another audio stream. However, in one embodiment, after one interval is retrieved from the interval fade-in audio stream 305, the streaming device 108 switches to the original audio stream 300.

The streaming device 108 can efficiently switch between the encoded video streams and/or audio streams by identifying the appropriate switch points in the sequence header indices. When switching between a currently playing encoded audio stream and a different encoded audio stream, the streaming device 108 searches the sequence header index included in the different encoded audio stream to locate the particular switch point specifying the playback offset associated with the next interval to be played. The streaming device 108 can then switch to the new encoded audio stream and download the interval stored in the data packet specified at the particular switch point for playback. For example, for encoded video streams where each interval was associated with a playback time interval of three seconds, if the first interval associated with the playback offset of zero seconds were currently being played, then the next interval to be played would be associated with the playback offset of three seconds. In such a scenario, the streaming device 108 searches the sequence header associated with the new encoded stream for the particular switch point specifying a playback offset of three seconds. Once locating the particular switch point, the streaming device 108 would download the interval stored in the data packet specified in the switch point for playback.

When the L-cut stream technique is used at the start of playback for a preview clip for a title or the title itself, playback of the audio stream begins before playback of the video stream. As shown in FIG. 4A, the video stream 310 that is generated by the video stream encoder 216 includes a sequence of video intervals 310(0), 310(1), 310(2), 310(3), 310(4), and 310(5) that correspond to audio intervals in the sequence 302(0), 300(1), 300(2), 300(3), 300(4), and 300(5) of the fade-in audio stream 302. Intervals 310(1), 310(2), 310(3), 310(4), and 310(5) are subsequent to interval 310(0) in the video stream 310. Similarly, 300(1), 300(2), 300(3), 300(4), and 300(5) are subsequent to interval 302(0) in the fade-in audio stream 302 and interval 300(0) in the original audio stream 300. The audio and video streams are synchronized during playback, and the streaming device 108 does not necessarily begin retrieving the video stream at the first interval.

As shown in FIG. 4A, the fade-in audio stream 302 playback begins at the audio playback point 401 with playback of interval 302(0). The audio playback point may be referred to as a presentation timestamp (PTS). The streaming device 108 selects a PTS that occurs later than the audio playback point 401 as a video start transfer point 403 when a video interval will be decoded and ready for playback at the PTS synchronized with output of the corresponding interval of audio data. In one embodiment, the streaming device 108 retrieves the video stream in forward order beginning with the interval 310(1) at the video start transfer point 403 and synchronized playback of the fade-in audio stream 302 and the video stream 310 occurs at the synchronized playback time 402.

To summarize, playback of the fade-in audio stream 302 begins with playback of the interval 302(0). During the playback of interval 302(0), subsequent intervals of the fade-in audio stream 302 are retrieved and the video stream 310 is retrieved in forward order starting at interval 310(1) and progressing away from the audio playback point 401 which coincides with the video start transfer point 403. When playback of the fade-in audio stream 302 reaches the synchronized playback time 402, the audio interval 300(1) and video interval 310(1) are played synchronously. In the situation where the video interval 310(1) has not been retrieved and/or decoded sufficiently to begin playback, the streaming device 108 may pause playback of the fade-in audio stream 302 until the video interval 310(1) is ready for playback. Alternatively, the streaming device 108 may continue playback of the fade-in audio stream 302 and select a new video start transfer point 403 at an interval boundary that occurs later than synchronized playback time 402. For example, a new video start transfer point may be selected at the start of interval 310(4) of the video stream 310 to allow more time for retrieving and decoding the video stream 310 starting at interval 310(4). In one embodiment, the streaming device 108 may retrieve a lower bit rate encoded video stream when the new video start transfer point is selected.

Figure 4B:
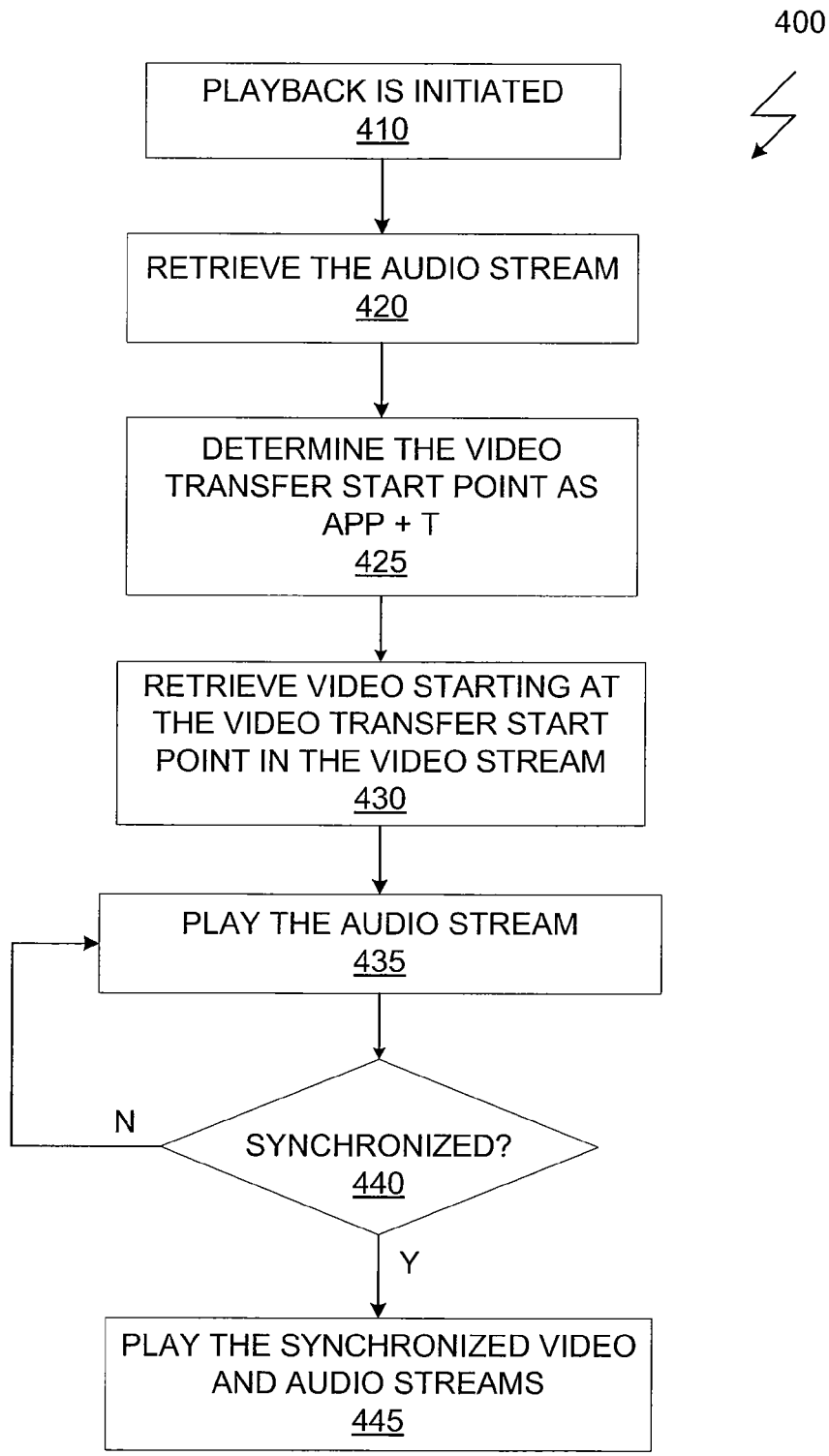
FIG. 4B is a flow diagram of method steps for beginning playback of the fade-in audio stream while the video stream is retrieved, according to one embodiment of the invention.

FIG. 4B is a flow diagram 400 of method steps for beginning playback of the fade-in audio stream 392 while the video stream 310 is retrieved, according to one embodiment of the invention. Although the method steps are described in conjunction with the systems for FIGS. 1 and 2, persons skilled in the art will understand that any system configured to perform the method steps, in any order, is within the scope of the invention.

At step 410, a playback application executed by the streaming device 108 initiates playback of digital media content at the audio playback point 401. At step 420, the playback application retrieves the audio stream beginning with the interval at the audio playback point 401. The playback application may retrieve the fade-in audio stream 302 or the original audio stream 300. At step 425, the playback application determines the video start transfer point 403 as the sum audio playback point (APP) 410 and T, where T is the duration in time of one or more intervals. The video start transfer point 403 should be located at an interval boundary to coincide with the start of a GOP.

At step 430, the playback application initiates retrieval of intervals of the video stream 310 starting at the video start transfer point 403 and progressing away from the audio playback point 401, i.e., in forward order. At step 435, the playback application plays interval 302(0) from the audio stream (the fade-in audio stream 392 or the original audio stream 300). At step 440, the playback application determines if the audio and video streams can be played synchronously, and, if not, then the playback application repeats step 435 to continue playing the audio stream 302 without playing the video stream 310. Otherwise, at step 445, the synchronized playback time 402 is reached and the playback application synchronously plays the audio stream and the video stream 310. The audio and video streams can be played synchronously when a decoded interval of video corresponding to the next interval of the video stream is available for playback at the start of the next interval.

Although, the intervals of fade-in audio stream 302 and the original audio stream 300 are shown as having a fixed size indicative of fixed bit rate encoding, the fade-in audio stream 302 and the fade-in audio stream 300 may also be encoded using a variable bit rate. When a variable bit rate (VBR) is used to encode the video and/or audio streams each interval is encoded based on the content for the respective interval. For example, interval for a scene of low complexity is encoded to a lower bit rate to "save" bits for scenes having a higher complexity. The average bit rate across a VBR video stream is, thus, not reflective of the bit rate of a particular interval within the VBR video stream.

The streaming device 108 may easily locate corresponding intervals in the original audio stream 300 and the fade-in audio stream 302 in order to switch from the fade-in audio stream 302 and the original audio stream 300 at an interval boundary. Switching from one audio stream to another allows for the generation of one or more fade-in intervals on-the-fly. Video data may be similarly encoded using a fixed bit rate or variable bit rate for the same digital media content and the streaming device 108 may switch between different video data streams at interval boundaries.

Prior to initiating playback, the streaming device 108 may measure available bandwidth from the content server and select a digital media content file having a bit rate that can be supported by the measured available bandwidth. To maximize playback quality, a digital media content file with the highest bit rate not exceeding the measured bandwidth is conventionally selected. To the extent the communications network 106 can provide adequate bandwidth to download the selected digital media content file while satisfying bit rate requirements, playback proceeds satisfactorily. In practice, however, available bandwidth in the communications network 106 is constantly changing as different devices connected to the communications network 106 perform independent tasks. In one embodiment, T may be determined based on the measured available bandwidth.

To counter the variability of network conditions, adaptive streaming may be implemented where, for each title, multiple video streams having different fixed bit rates exist. As the network conditions vary, the streaming device 108 may switch between video streams according to the network conditions. For example, video data may be downloaded from video streams encoded to higher fixed bit rates when the network conditions are good, and, when the network conditions deteriorate, subsequent video data may be downloaded from video streams encoded to lower fixed bit rates. The bit rate of the audio stream is typically much lower than the bit rate of the video stream, so the audio stream is typically only encoded for a single fixed bit rate. Because the bit rate for a particular interval of a VBR encoded video stream is not fixed, adaptive stream is best suited for use with fixed bit rate streams.

Figure 5:
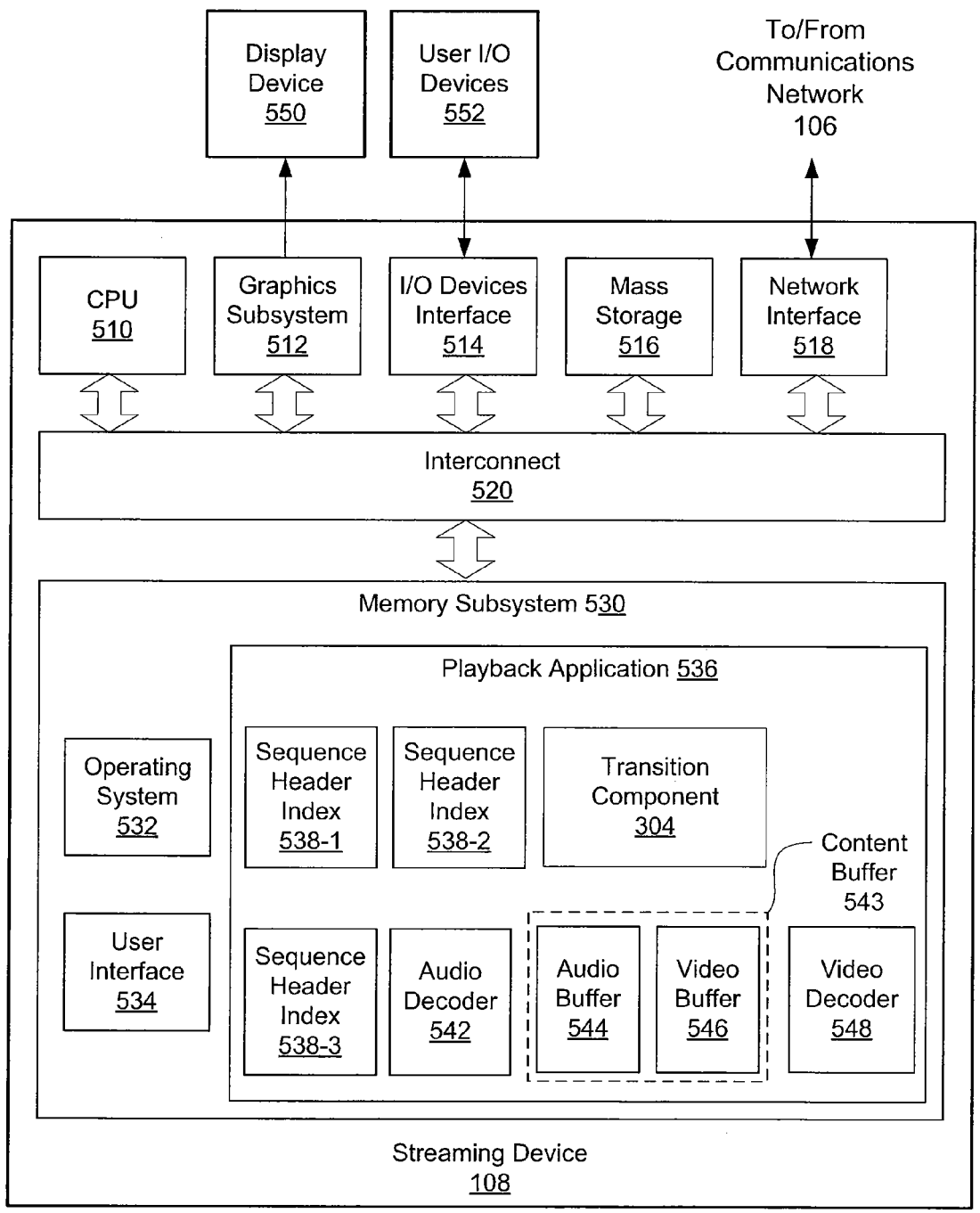
FIG. 5 is a more detailed view of the streaming device of FIG. 1, according to one embodiment of the invention.

FIG. 5 is a more detailed view of the streaming device 108 of FIG. 1, according to one embodiment of the invention. As shown, the streaming device 108 includes, without limitation, a central processing unit (CPU) 510, a graphics subsystem 512, an input/output (I/O) device interface 514, a network interface 518, an interconnect 520, and a memory subsystem 530. The streaming device 108 may also include a mass storage unit 516.

The CPU 510 is configured to retrieve and execute programming instructions stored in the memory subsystem 530. Similarly, the CPU 510 is configured to store and retrieve application data residing in the memory subsystem 530. The interconnect 520 is configured to facilitate transmission of data, such as programming instructions and application data, between the CPU 510, graphics subsystem 512, I/O devices interface 514, mass storage 516, network interface 518, and memory subsystem 530.

The graphics subsystem 512 is configured to generate image frames of video data and transmit the frames of video data to display device 550. In one embodiment, the graphics subsystem 512 may be integrated into an integrated circuit, along with the CPU 510. The display device 550 may comprise any technically feasible means for generating an image for display. For example, the display device 550 may be fabricated using liquid crystal display (LCD) technology, cathode-ray technology, and light-emitting diode (LED) display technology (either organic or inorganic). An input/output (I/O) device interface 514 is configured to receive input data from user I/O devices 552 and transmit the input data to the CPU 510 via the interconnect 520. For example, user I/O devices 552 may comprise one of more buttons, a keyboard, and a mouse or other pointing device. The I/O device interface 514 also includes an audio output unit configured to generate an electrical audio output signal. User I/O devices 552 includes a speaker configured to generate an acoustic output in response to the electrical audio output signal. In alternative embodiments, the display device 550 may include the speaker. A television is an example of a device known in the art that can display video intervals and generate an acoustic output. A mass storage unit 516, such as a hard disk drive or flash memory storage drive, is configured to store non-volatile data. A network interface 518 is configured to transmit and receive packets of data via the communications network 106. In one embodiment, the network interface 518 is configured to communicate using the well-known Ethernet standard. The network interface 518 is coupled to the CPU 510 via the interconnect 520.

The memory subsystem 530 includes programming instructions and data that comprise an operating system 532, user interface 534, and playback application 536. The operating system 532 performs system management functions such as managing hardware devices including the network interface 518, mass storage unit 516, I/O device interface 514, and graphics subsystem 512. The operating system 532 also provides process and memory management models for the user interface 534 and the playback application 536. The user interface 534 provides a specific structure, such as a window and object metaphor, for user interaction with streaming device 108. Persons skilled in the art will recognize the various operating systems and user interfaces that are well-known in the art and suitable for incorporation into the streaming device 108.

The playback application 536 is configured to retrieve digital media content, e.g., audio and video streams, from the streaming server 102 via the network interface 518 and play the digital media content through the graphics subsystem 512. The graphics subsystem 512 is configured to transmit a rendered video signal to the display device 550. In normal operation, the playback application 536 receives a request from a user to play a specific title. The playback application 536 then identifies the different encoded video streams associated with the requested title, wherein each encoded video stream is encoded to a different playback bit rate. A preview clip may be encoded separately from the requested title or may be indicated by an index into the video and audio streams encoded for the requested title.

After the playback application 536 has located the encoded video streams associated with the requested title, the playback application 536 downloads sequence header indices associated with each encoded video stream associated with the requested title from the streaming server 102. As previously described herein, a sequence header index associated with an encoded video stream includes information related to the encoded sequence included in the digital media content file.

In one embodiment, the playback application 536 begins downloading the digital media content file associated with the requested title comprising the encoded sequence encoded to the lowest playback bit rate to minimize startup time for playback. For the purposes of discussion only, the digital media content file is associated with the requested title and comprises the encoded sequence encoded to the lowest playback bit rate. The requested digital media content file is downloaded into the content buffer 543, configured to serve as a first-in, first-out queue. In one embodiment, each unit of downloaded data comprises a unit of video data or a unit of audio data. As units of video data associated with the requested digital media content file are downloaded to the streaming device 108, the units of video data are pushed into the content buffer 543. Similarly, as units of audio data associated with the requested digital media content file are downloaded to the streaming device 108, the units of audio data are pushed into the content buffer 543. In one embodiment the units of video data are stored in video buffer 546 within the content buffer 543, and units of audio data are stored in audio buffer 544, also within the content buffer 543.

A video decoder 548 reads units of video data from the video buffer 546, and renders the units of video data into a sequence of video frames corresponding in duration to the fixed span of playback time. Reading a unit of video data from the video buffer 546 effectively de-queues the unit of video data from the video buffer 546 (and from the content buffer 543). The sequence of video intervals is processed by graphics subsystem 512 and transmitted to the display device 550.

An audio decoder 542 reads units of audio data from the audio buffer 544, and processes the units of audio data into a sequence of audio samples, generally synchronized in time with the sequence of video frames. In one embodiment, the sequence of audio samples is transmitted to the I/O device interface 514, which converts the sequence of audio samples into the electrical audio signal. The electrical audio signal is transmitted to the speaker within the user I/O devices 552, which, in response, generates an acoustic output.

Given the bandwidth limitations of the communications network 106, the playback application 536 may download consecutive portions of video data from different constant bit rate encoded video streams based on available bandwidth. Other performance factors that may influence the specific encoded stream from which to download the portion of video data include the buffer size of the video buffer 546, the behavior of the end-user viewing the video content, the type of display being generated (high-definition, standard-definition, etc) and the available lead time. These factors combined with the bandwidth limitations of the communications network 106 may be used to determine a specific encoded video stream from which to download each interval of the video data.

The transition component 304 receives content playback information including the content title and playback starting point. The sequence header indexes 538-1, 538-2, and 538-3 are each associated with a respective video or audio stream and are used by the transition component 304 to locate switch points defined by the SHI generator 218 within each stream. The transition component 304 may switch from playing a fade-in audio stream at an interval boundary to playing an original audio synchronized with a video stream. When the playback starting point is not aligned on an interval boundary or at the start of the digital media content, the transition component 304 determines the nearest (or closest) interval in the digital media content at which to retrieve the audio stream as the audio playback point and determines the video start transfer point. The transition component 304 begins synchronized playback of the audio and video streams when an interval of the video stream is received and decoded.

FIG. 6A is another illustration of playback of the fade-in audio stream 302 and synchronization with the video stream 310, according to one embodiment of the invention. As previously described, when the L-cut stream technique is used at the start of playback for a preview clip for a title or the title itself, playback of the audio stream begins before playback of the video stream. As shown in FIG. 4B, the fade-in audio stream 302 playback begins at the audio playback point 601 with playback of interval 302(0). The streaming device 108 selects a PTS that occurs later than the audio playback point 401 as a video start transfer point 603 when a video interval will be decoded and ready for playback with output of the corresponding interval of audio data. In one embodiment, the streaming device 108 retrieves the video stream 310 in reverse order starting at the interval 310(5) corresponding to the video start transfer point 603 and progressing toward the audio playback point 401. In contrast with the technique described in conjunction with FIG. 4A where intervals of the video stream 310 are retrieved in forward order, as shown in FIG. 6A, intervals of the video stream 310 are retrieved in reverse order. In other words, interval 310(4) is retrieved after interval 310(5). If playback of the audio stream has not reached interval 310(3), then interval 310(3) may be retrieved after interval 310(4) is received. Synchronized playback of the audio stream and the video stream 310 occurs at an interval boundary when the corresponding interval of video stream 310 is available for playback, e.g., is already decoded. The time at which the synchronized playback occurs is the synchronized playback time 605. The synchronized playback time 605 is not known until the interval boundary where synchronization occurs is reached during playback.

To summarize, playback of the fade-in audio stream 302 begins with playback of the interval 302(0). During the playback of interval 302(0), subsequent intervals of the fade-in audio stream 302 or the original audio stream 300 are retrieved and the video stream 310 is retrieved starting at interval 310(5) which coincides with the video start transfer point 603. The video intervals are retrieved in reverse order until synchronized playback begins. After synchronized playback begins, intervals of the video stream 310 are retrieved in forward order starting at the video start transfer point 603. Assuming that synchronized playback begins at the synchronized playback tie 605, the audio interval 300(3) and video interval 310(3) are played synchronously.

Figure 6B:
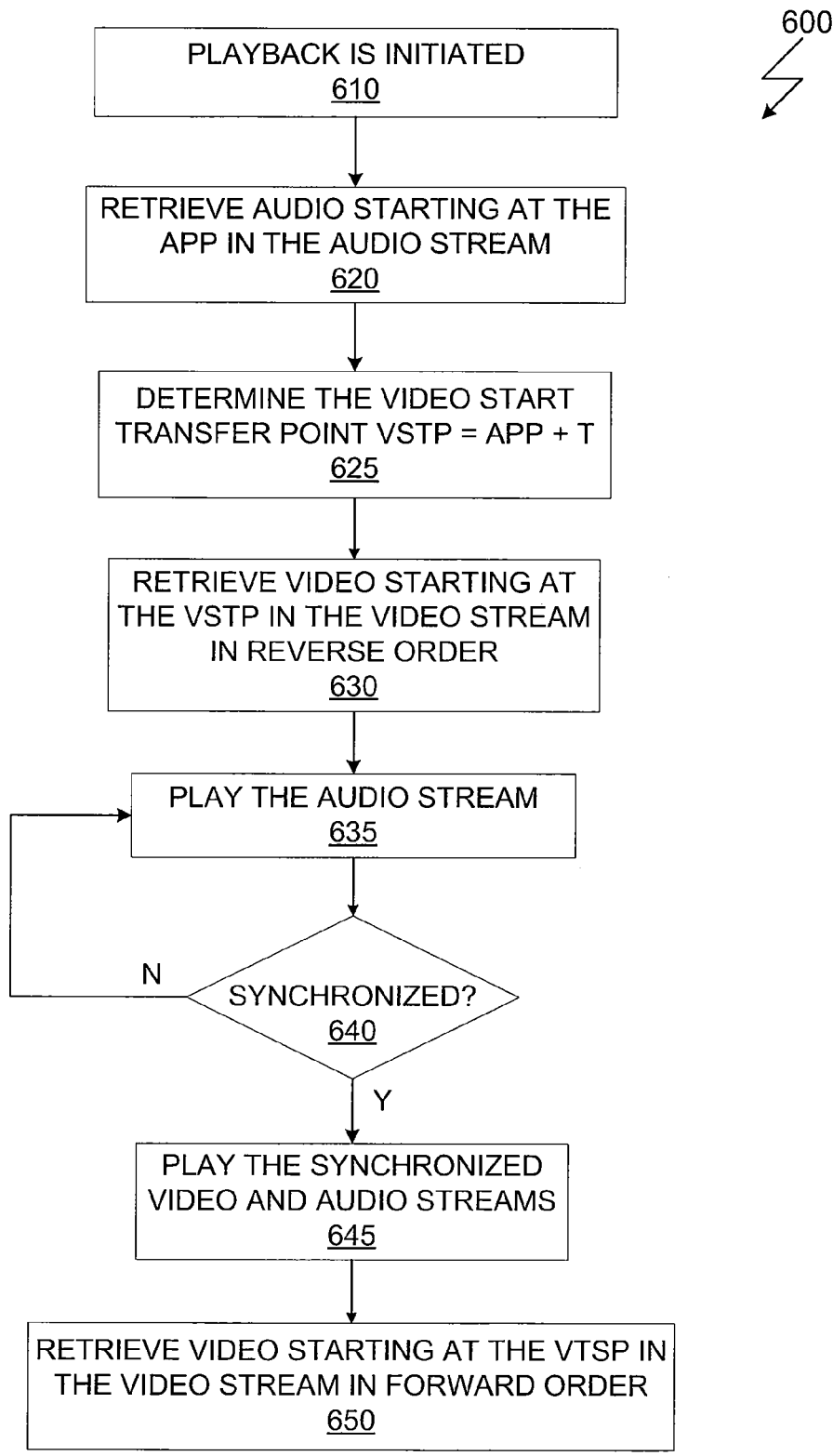
FIG. 6B is another flow diagram of method steps for beginning playback of the fade-in audio stream while the video stream is retrieved, according to one embodiment of the invention.

FIG. 6B is a flow diagram 600 of method steps for beginning playback of the fade-in audio stream 302 or the original audio stream 300 while the video stream 310 is retrieved, according to one embodiment of the invention. Although the method steps are described in conjunction with the systems for FIGS. 1, 2, and 5, persons skilled in the art will understand that any system configured to perform the method steps, in any order, is within the scope of the invention.

At step 610, playback application 536 that is executed by the streaming device 108 initiates playback of digital media content at the audio playback point 601. At step 620, the playback application 536 retrieves the audio stream beginning with the interval at the audio playback point 601. The playback application 536 may retrieve the fade-in audio stream 302 or the original audio stream 300. At step 625, the playback application determines the video start transfer point 603 as the sum of the audio playback point (APP) 601 and T, where T is the duration in time of one or more intervals of the video stream 310. The video start transfer point 603 should be located at an interval boundary to coincide with the start of a GOP and at a point that allows for at least one interval of video data to be received and decoded. In one embodiment T is a duration in time that is not necessarily equal to one or more intervals of the video stream 310, and the closest interval boundary to the sum of APP 601 and T is identified and determined as the video start transfer point 603.

At step 630, the playback application initiates retrieval of intervals of the video stream 310 in reverse order starting at the video start transfer point 603 and progressing towards the audio playback point 601. At step 635 the playback application 536 plays interval 302(0) from the audio stream (the fade-in audio stream 392 or the original audio stream 300). In one embodiment, the playback application 536 plays one or more still frames of fade-in video data while retrieving the video data stream 310.

At step 640, the playback application determines if the audio and video streams can be synchronized, and, if not, then the playback application repeats step 635 to continue playing the audio stream 302 without playing the video stream 310. The audio and video streams may be synchronized when a decoded interval of video corresponding to the next interval of the video stream is available for playback at the start of the next interval. When, at step 645, the audio and video streams can be synchronized, the synchronized playback time is reached and the playback application 536 synchronously plays the audio stream and the video stream 310.

In order to select a specific encoded video stream for the same digital media content from a set of fixed bit rate encoded video streams representing the same video data, the playback application 536 executing on the streaming device 108 may be configured to dynamically determine the encoding level (high, medium, or low bit rate) of the video stream for the next portion of the video data to be downloaded during playback of a different (previous) portion of the digital video content.

One advantage of the disclosed technique is that the perceived delay between the time a user selects the digital media content to when playback of the digital media content begins is reduced because playback of the audio portion of the digital media content starts before the video portion of the digital media content is received. The audio may be faded-in and one or more still image frames of the video data may be displayed while the full video data is retrieved. Additionally, a license for DRM encryption of the title content may be retrieved before starting playback of the video, so that the digital media content that is retrieved is protected. When a user first views a preview clip for a particular title, the DRM encryption license may be transmitted while the video stream for the preview clip is retrieved. In the event that the user selects the particular title for full playback, no additional delay will be incurred to retrieve the DRM encryption license before playback of the title can begin.

In one embodiment of the invention the streaming device 108 comprises an embedded computer platform such as a set top box. In such an embodiment executable instructions may be encoded as firmware within the streaming device 108. An alternative embodiment of the invention may be implemented as a program product that is downloaded to a memory within a computer system, for example as executable instructions embedded within an internet web site that are downloaded to memory subsystem 530 within the streaming device 108. In this embodiment, the streaming device 108 comprises the computer system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for playback of an audio stream before synchronized playback of the audio stream with a video stream, the method comprising:

receiving, when playback of a selected digital media content having an audio stream and a video stream is initiated, an audio playback point within the digital media content, wherein audio stream and the video stream which are encoded as corresponding sequences of intervals;

retrieving a first interval of the audio stream beginning at the audio playback point;

initiating retrieval of one or more additional intervals of the audio stream that are subsequent to the first interval;
playing the first interval of the audio stream without yet playing any interval of the video stream; and
synchronizing playback of the video stream to the audio stream by:
    determining a video start transfer point that occurs subsequent to the audio playback point; and
    initiating retrieval of the video stream beginning at the video start transfer point;
    playing back at least a portion of the retrieved video by skipping playback of at least one frame of the video stream while playing a corresponding portion of the audio stream;
    upon determining that the audio stream and the video stream can be played synchronously, synchronously playing the audio stream and the video stream; and
    upon determining that the audio stream and the video stream cannot be played synchronously because the video stream is not available:
        continuing playback of the audio stream;
        determining a new video start transfer point that occurs subsequent to the video start transfer point; and
        initiating retrieval of the video stream beginning at the new video start transfer point.

2. The computer-implemented method of claim 1, wherein the first interval of the audio stream comprises a modulated version of an original audio stream, wherein the corresponding portion of the audio stream is played without having retrieved, in its entirety, the at least one frame of the video stream.

3. A non-transitory computer-readable medium storing instructions that, when executed by a processor, cause a computer system to play an audio stream before beginning synchronized playback of the audio stream with a video stream, by performing the steps of:
receiving, when playback of a selected digital media content having an audio stream and a video stream is initiated, an audio playback point within the digital media content, wherein audio stream and the video stream which are encoded as corresponding sequences of intervals;
retrieving a first interval of the audio stream beginning at the audio playback point;
initiating retrieval of one or more additional intervals of the audio stream that are subsequent to the first interval;
playing the first interval of the audio stream without yet playing any interval of the video stream; and
synchronizing playback of the video stream to the audio stream by:
    determining a video start transfer point that occurs subsequent to the audio playback point;
    initiating retrieval of the video stream beginning at the video start transfer point;
    playing back at least a portion of the retrieved video by skipping playback of at least one frame of the video stream while playing a corresponding portion of the audio stream;
    upon determining that the audio stream and the video stream can be played synchronously, synchronously playing the audio stream and the video stream; and
    upon determining that the audio stream and the video stream cannot be played synchronously because the video stream is not available:
        continuing playback of the audio stream;
        determining a new video start transfer point that occurs subsequent to the video start transfer point; and
        initiating retrieval of the video stream beginning at the new video start transfer point.

4. The non-transitory computer-readable medium of claim 3, wherein the corresponding portion of the audio stream is played without having retrieved, in its entirety, the at least one frame of the video stream, wherein determining that the audio stream and the video stream can be played synchronously comprises determining that a decoded interval of video corresponding to a next interval of the video stream is available for playback at the start of the next interval.

5. The non-transitory computer-readable medium of claim 4, further comprising:
retrieving one or more intervals of the video stream in forward order beginning at the video start transfer point and progressing away from the audio playback point.

6. The non-transitory computer-readable medium of claim 3, wherein one or more intervals of the video stream are retrieved in reverse order beginning at the video start transfer point and progressing towards the audio playback point.

7. The non-transitory computer-readable medium of claim 3, further comprising determining an interval boundary closest to a selected playback location in the audio stream as the audio playback point.

8. The non-transitory computer-readable medium of claim 3, wherein the first interval of the audio stream comprises a modulated version of an original audio stream.

9. The non-transitory computer-readable medium of claim 3, wherein the video start transfer point is computed as the sum of the audio playback point and a duration in time of one or more intervals of the video stream.

10. The non-transitory computer-readable medium of claim 3, wherein intervals of the video stream are retrieved in forward order beginning at the video start transfer point and progressing away from the audio playback point.

11. The non-transitory computer-readable medium of claim 3, wherein the audio stream comprises a fade-in audio stream that is generated as a version of an original audio stream that starts at a low volume level and increases the volume level across the first interval of the audio stream.

12. The non-transitory computer-readable medium of claim 3, further comprising displaying a still video frame while playing the first interval of the audio stream.

13. The non-transitory computer-readable medium of claim 3, wherein the audio stream is precomputed.

14. The non-transitory computer-readable medium of claim 3, wherein the audio stream is generated in real-time.

15. A system, comprising:
one or more computer processors; and
a memory containing a program which when executed by the one or more computer processors performs an operation to playback an audio stream before synchronized playback of the audio stream with a video stream, the operation comprising:
    receiving, when playback of a selected digital media content having an audio stream and a video stream is initiated, an audio playback point within the digital media content, wherein audio stream and the video stream which are encoded as corresponding sequences of intervals;
    retrieving a first interval of the audio stream beginning at the audio playback point;
    initiating retrieval of one or more additional intervals of the audio stream that are subsequent to the first interval;

playing the first interval of the audio stream without yet playing any interval of the video stream; and synchronizing playback of the video stream to the audio stream by:

determining a video start transfer point that occurs subsequent to the audio playback point; and initiating retrieval of the video stream beginning at the video start transfer point;

playing back at least a portion of the retrieved video by skipping playback of at least one frame of the video stream while playing a corresponding portion of the audio stream;

upon determining that the audio stream and the video stream can be played synchronously, synchronously playing the audio stream and the video stream; and upon determining that the audio stream and the video stream cannot be played synchronously because the video stream is not available:

continuing playback of the audio stream;

determining a new video start transfer point that occurs subsequent to the video start transfer point; and initiating retrieval of the video stream beginning at the new video start transfer point.

16. The system of claim 15, wherein the first interval of the audio stream comprises a modulated version of an original audio stream.

17. The system of claim 15, wherein one or more intervals of the video stream are retrieved in reverse order beginning at the video start transfer point and progressing towards the audio playback point.

18. The system of claim 15, the operation further comprising:

upon determining that the audio stream and the video stream cannot be played synchronously because the video stream is not available for playback, pausing playback of the audio stream until the video stream is available for playback.

\* \* \* \* \*